TUNNEL DIODE CONTROLLED MAGNETIC TRIGGERS

Filed Dec. 2, 1959

INVENTORS
SAMMY A. BUTLER
DALE L. CRITCHLOW
BY
ATTORNEY

March 23, 1965 S. A. BUTLER ETAL 3,175,096

TUNNEL DIODE CONTROLLED MAGNETIC TRIGGERS

Filed Dec. 2, 1959 3 Sheets-Sheet 2

United States Patent Office 3,175,096
Patented Mar. 23, 1965

3,175,096
TUNNEL DIODE CONTROLLED MAGNETIC TRIGGERS

Sammy A. Butler, Peekskill, and Dale L. Critchlow, Lincolndale, N.Y., assignors to International Business Machines Corporation, New York, N.Y., a corporation of New York Filed Dec. 2, 1959, Ser. No. 856,756
16 Claims. (Cl. 307—88)

This invention relates to trigger circuits and more particularly to triggers employing Esaki diodes in combination with magnetic cores.

An article in the Physical Review for January 1958, on pages 603–604, entitled "New Phenomenon in Narrow Germanium P-N Junctions," by Leo Esaki, describes a semi-conductor structure which has come to be known as an "Esaki Diode," sometimes alternately referred to in the literature and herein as a "tunnel diode." As described by Esaki, this diode is a P-N Junction device in which the junction is very thin, i.e., narrow, in the currently accepted terminology (on the order of 150 Angstrom units or less) and in which the semiconductor materials on both sides of the junction have high impurity concentrations (of the order of $10^{-19}$ net donor or acceptor atoms per cubic centimeter for germanium).

The Esaki diode is characterized by a very low reverse impedance, approaching a short circuit, with a forward potential current characteristic exhibiting a negative resistance region beginning at a small value of forward potential (on the order of 0.05 volt) and ending at a large forward potential (of the order of 0.2 volt). The potential value of the low potential end of the negative resistance region is very stable with respect to temperature and does not vary over a range of temperatures of a value near 0° K. to several hundred degrees K. For potential values outside the limited range as described above, forward resistance of the Esaki diode is positive. The Esaki diode may then be referred to as a diode exhibiting an "n" type characteristic curve for a plot of current vs. potential. For a more complete understanding of the structure and the operational characteristics of the Esaki diode, reference is made to an article appearing in the Proceedings of the IRE, July 1959, pages 1201–1206, entitled "Tunnel Diodes as Higher Frequency Devices," by H. S. Sommers, Jr.

Because of the unique characteristics of an Esaki diode, it has been found, experimentally, that trigger circuits employing a combination of Esaki diodes and magnetic cores may be constructed capable of operating at very high repetition rates, employing a minimum of components.

The trigger circuits of this invention employ a single tunnel diode constructed to provide a load characteristic to the Esaki to ensure operation thereof in a first stable state, characterized by a low voltage and a high current, and a second stable state, characterized by a comparatively large voltage and low current. Means magnetically coupled to the circuit are employed to provide a trigger input which switches the Esaki from one stable operating state to another. More specifically, a trigger circuit in accordance with this invention is constructed by utilizing a tunnel diode in parallel with a resistor, both of which are connected to a source of constant current. Magnetic means are then provided for intercoupling the two parallel circuits with input means coupled thereto adapted to be energized and cause the tunnel diode to switch from one to another of its stable operating states. Outputs for the triggers are obtained across the tunnel diode or by means of a further winding coupling said magnetic means. Further, these triggers have been found to operate equally well with input signals of either polarity and in order to provide such triggers responsive to a given polarity signal only, the magnetic means employed is biased to sensitize the trigger arbitrarily to positive pulses only and thereby provide binary trigger circuits.

Utilizing these polarity sensitized trigger circuits, a binary counter is constructed as an example of how these triggers may be utilized wherein a first trigger circuit is coupled to a second similar trigger circuit whereby an input signal applied to first trigger circuit switches it from one operating state to another. Since the first trigger provides a positive output signal when switched from the first to the second stable state and a negative output signal when switched back to the first stable state, the second trigger only switches its stable state when the first trigger is caused to switch from the first to the second stable state. Thus, for every two input signals to the first trigger, the second trigger changes its stable state once. Coupling one such trigger circuit to another is achieved by magnetic means or by capacitive type coupling.

Accordingly, a prime object of this invention is to provide novel trigger circuits.

A further object of this invention is to provide novel trigger circuits employing an "n" type characteristic diode and magnetic means intercoupled with the diode for triggering and providing an output for the circuit.

Yet another object of this invention is to provide a novel trigger circuit employing a tunnel diode and a quadrature field device for triggering the diode.

Another object of this invention is to provide a novel trigger circuit employing a tunnel diode and a magnetic thin film element as principal components therein whereby the film element is utilized to trigger the diode from one stable operating state to another.

The foregoing and other objects, features and advantages of the invention will be apparent from the following more particular description of preferred embodiments of the invention, as illustrated in the accompanying drawings.

Figure 3A:
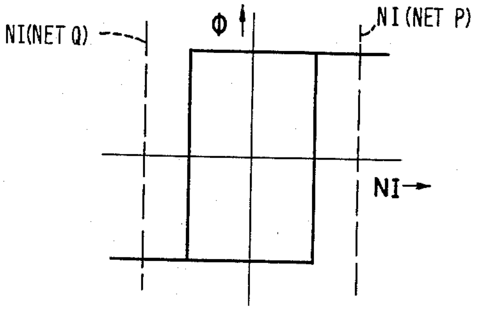
Figure 3B:
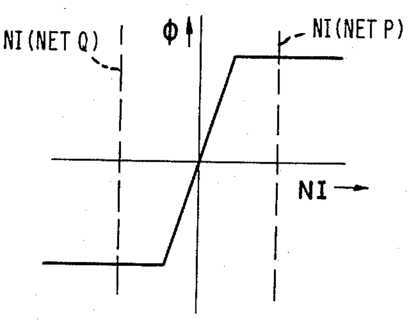

FIGS. 3*a* and 3*b* illustrate typical characteristics of the magnetic material herein employed in the circuits of this invention.

Figure 4:
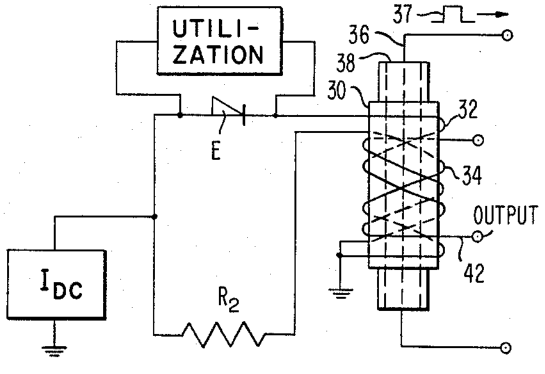

FIG. 4 illustrates a trigger circuit in accordance with another embodiment of this invention.

Figure 5:
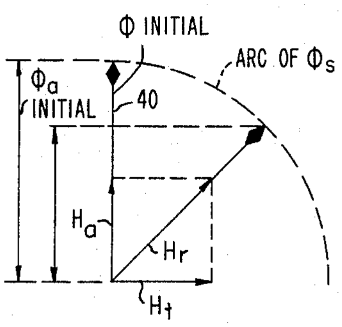

FIG. 5 illustrates the applied fields and flux vectors obtained in the operation of the circuit of FIG. 4.

Figure 6:
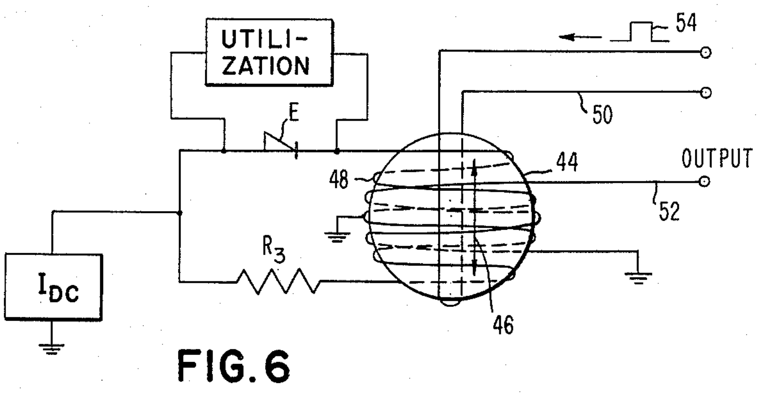

FIG. 6 illustrates another trigger circuit in accordance with another embodiment of this invention.

Figures 7, 8:
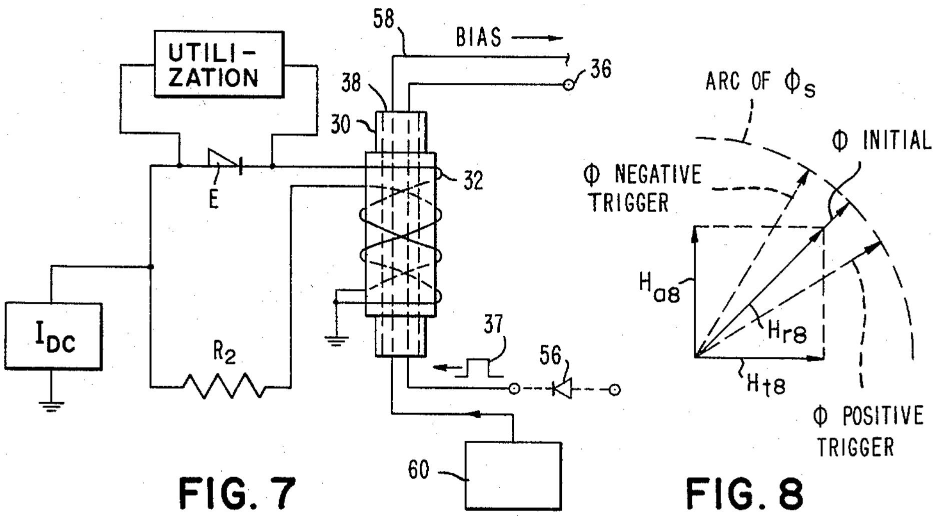

FIG. 7 illustrates another embodiment of this invention wherein the trigger circuit of FIG. 4 is sensitized.

FIG. 8 illustrates the applied fields and flux vectors obtained in operation of the circuit of FIG. 7.

Figure 1:
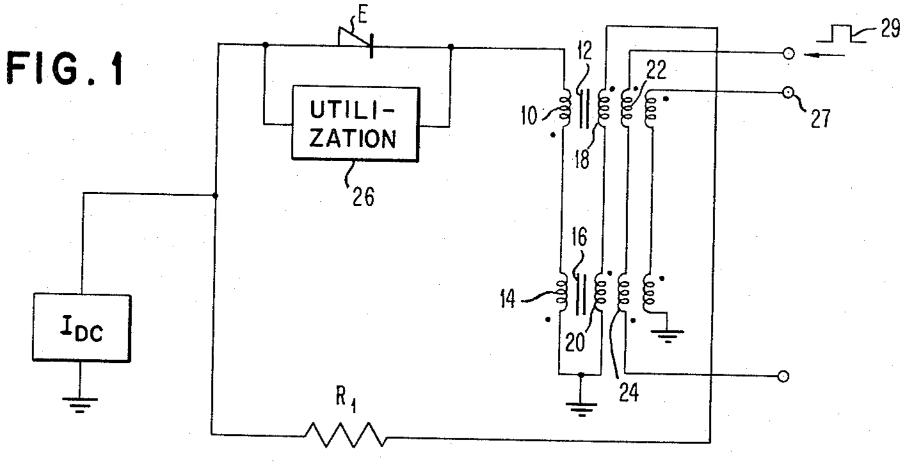
FIG. 1 is a circuit illustrating one embodiment of a trigger circuit in accordance with this invention.
Figure 9:
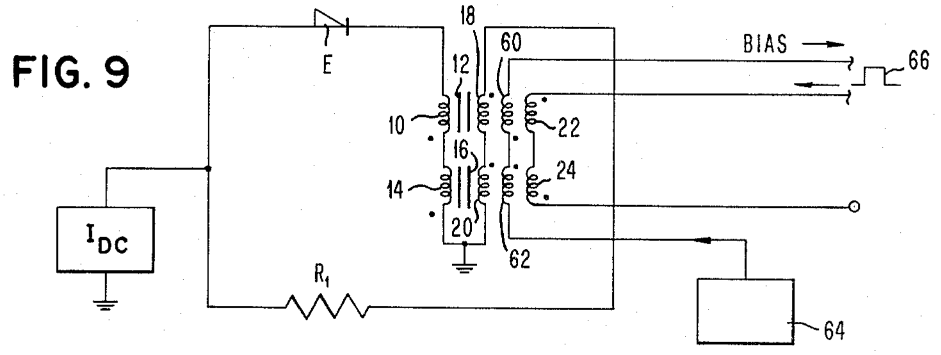

FIG. 9 illustrates another embodiment of this invention wherein the trigger circuit of FIG. 1 is sensitized.

Figure 10:
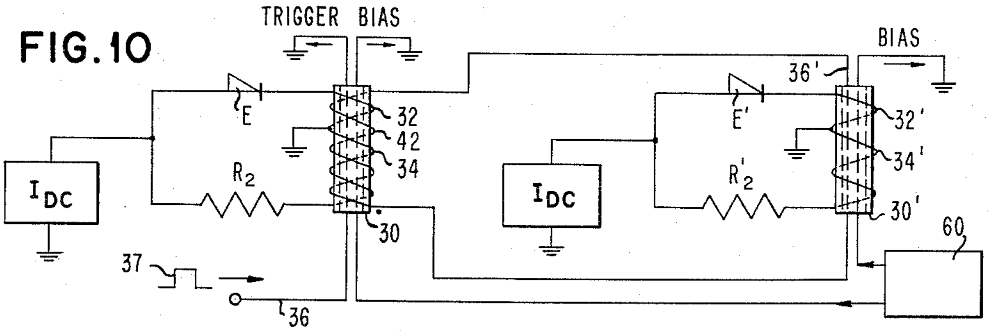

FIG. 10 illustrates a counter-circuit in accordance with this invention.

Figure 11:
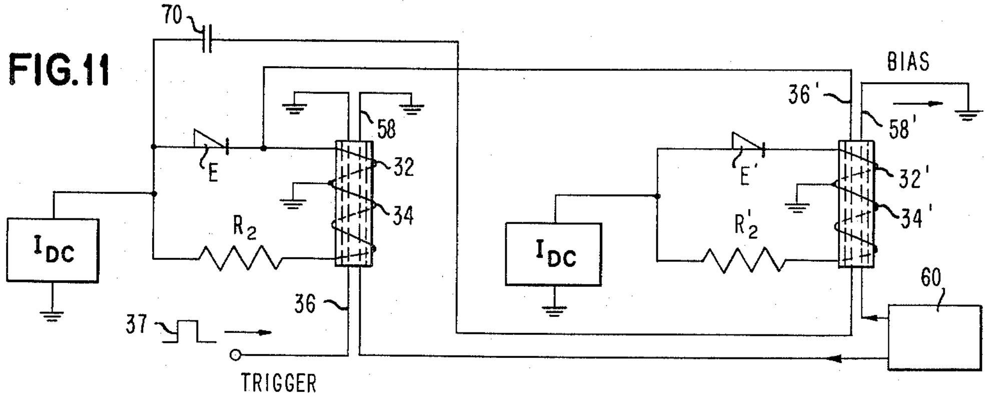

FIG. 11 illustrates a counter-circuit in accordance with this invention.

Figure 12:
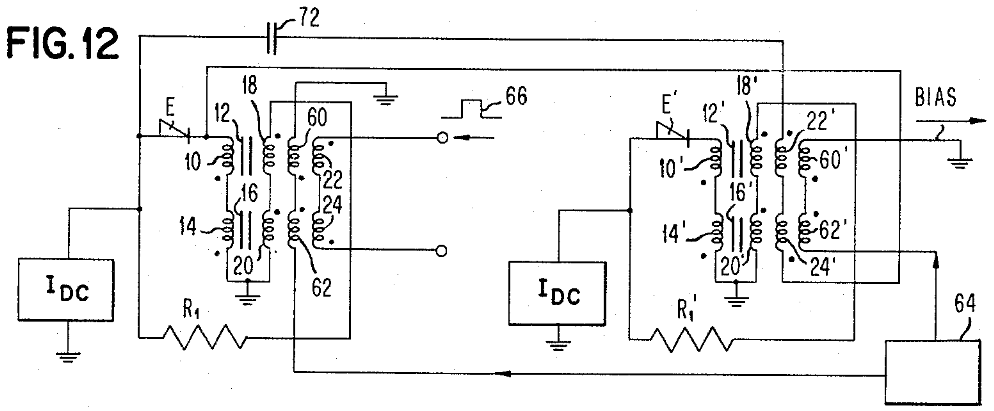

FIG. 12 illustrates yet another counter-circuit in accordance with this invention.

Referring to the FIG. 1, a basic trigger circuit in accordance with this invention, is shown which employs, as an integral element therein, a tunnel or Esaki diode E. One end of the Esaki is connected to a constant current source $I_{dc}$ while the other end is connected to ground through a winding 10 on a core 12 and a winding 14 on a core 16. In parallel with the Esaki and the windings is a circuit commoned with the source $I_{dc}$ having a resistor $R_1$ connected to ground through a winding 18 on the core 12 and a winding 20 on the core 16. Trigger pulses are fed to the circuit by means of a winding 22 on the core 12 serially connected to a winding 24 on the core 16. Outputs are obtained from the circuit across the Esaki which is connected to a utilization means 26, or by means of an alternate output line 27 coupling each of the cores 12 and 16 as shown.

Figure 2:
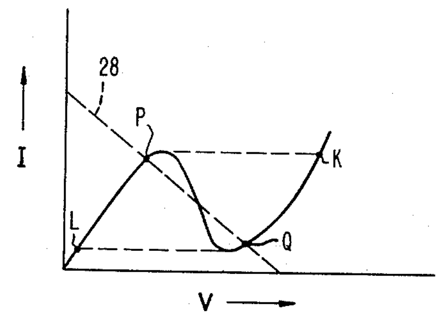
FIG. 2 illustrates a plot of current (I) vs. potential (V) of the type diode characteristic herein employed.

Referring to the FIG. 2, a plot of current I vs. voltage V for the Esaki is shown describing the well-known type characteristic. Resistor $R_1$ and source current $I_{dc}$ in the circuit of FIG. 1 are chosen so that a load line 28 in the FIG. 2 intersects the Esaki characteristic curve at two points, labelled P and Q.

The cores 12 and 16 may be fabricated of magnetic material exhibiting a rectangular hysteresis characteristic as is shown in FIG. 3*a*, but, as will be described in detail subsequently it is not necessary that the cores have remanent characteristics but only that they exhibit saturation characteristics and may have a type of hysteresis characteristic as shown in the FIG. 3*b* which describes saturable reactor type material.

A dot is shown adjacent one terminal of each of the windings in the FIG. 1 indicating its winding direction. A positive pulse directed into the undotted terminal of a winding is assumed to cause the core to switch toward positive saturation while the positive pulse directed into the dotted end is assumed to cause the core to switch to negative saturation.

Assuming that the cores 12 and 16 of the FIG. 1 exhibit the characteristics as shown in the FIG. 3*a* and that the Esaski is operated in the P state, the circuit operation is as follows. In the circuit including the Esaki, current passes through the Esaki into the undotted ends of the windings 10 and 14 on the cores 12 and 16, respectively, tending to cause the cores 12 and 16 to assume positive saturation. The current flowing in the parallel circuit including the resistor R is directed into the dotted terminals of the windings 18 and 20 on the cores 12 and 16, respectively, tending to cause the cores 12 and 16 to assume negative saturation. Since the source $I_{dc}$ is a constant current source which supplies both parallel circuits, and the Esaki is operated in the state P, a larger current flows through the circuit including the Esaki causing a net M.M.F. on the cores 12 and 16 which causes the cores to switch toward positive saturation as is seen in the FIG. 3*a*. Assuming that a trigger pulse 29 is supplied to the windings 22 and 24 which is directed into the dotted end of the winding 22 and the undotted end of the winding 24 on the cores 12 and 16, respectively. Since the pulse 29 is directed into the undotted end of the winding 24, the core 16 is pushed further into positive saturation. However, the pulse 29 being directed into the dotted end of the winding 22 causes the core 12 to start switching toward negative saturation. As the core 12 is switched toward negative saturation, a voltage is induced on the windings 10 and 18 with the dotted end positive, causing increased current flow through the Esaki. The Esaki must then allow this increased current in the circuit and therefore moves from its stable operating state P along its characteristic curve, toward the right as shown in the FIG. 2, to the knee of the curve and then jumps to a point K. The trigger pulse is so timed as to terminate just after the point K is reached, and the Esaki moves toward its stable operating state Q. With the current through the Esaki decreasing, the current through the resistor R increases, directing increasing current into the dotted end of the windings 18 and 20, respectively causing the cores 12 and 16 to switch from positive toward negative saturation since the net M.M.F. on the cores 12 and 16 is great enough to cause switching as indicated in the FIG. 3*a*. As the cores 12 and 16 switch toward negative saturation, an output signal is provided on the output line 27 and the circuit stabilizes at point Q when the cores 12 and 16 are completely switched to negative saturation.

Upon application of another trigger pulse 29 to the windings 22 and 24 on the cores 12 and 16 respectively, the core 16 is switched from the negative saturation toward positive saturation causing an induced voltage on the winding 14 of the core 16 with the undotted end positive. The voltage induced on the winding 14 causes decreasing current to flow in the circuit including the Esaki. Referring to the FIG. 2 the operating point of the Esaki then moves to the left along its characteristic curve from operating state Q to the lower knee and thence jumps to point L, at which time the pulse 29 is terminated. The Esaki then moves from point L on its characteristic curve toward its stable operating point P, causing increased current flow through the Esaki which switches the cores 12 and 16 toward positive saturation. As the cores 12 and 16 are switched toward positive saturation, an output signal is induced on the output line 27, of opposite polarity than that provided above when the cores 12 and 16 were switched from positive to negative saturation.

Considering the circuit above, it should be noted that: (*a*) the polarity of the trigger pulse is not important since the windings 22 and 24 on the cores 12 and 16, respectively, are wound serially opposed; (*b*) that the information storage in the circuit is performed by the Esaki; (*c*) that each of the cores 12 and 16 are switched toward different saturation states when the circuit is triggered, and kept in these saturation states. Thus, the cores 12 and 16 need not be made of magnetic material having the characteristics as shown in FIG. 3*a* but need only be made of material having characteristics as shown in the FIG. 3*b* and will work equally well since saturation is the operative necessity of the circuit only. Outputs from the circuit are preferably taken across the Esaki since the voltage obtained in transition between points P and K and between points Q and L is large enough to be employed by the utilization means 26, however an alternate means of obtaining an output is by use of the output line 27.

Referring now to the FIG. 4, a quadrature field device is shown which accomplishes the same trigger operation that is described for the FIG. 1. A cylindrical core 30 made of magnetic material exhibiting a hysteresis characteristic is shown in the FIGS. 3*a* or 3*b*. The core 30 is provided with a winding 32 and a winding 34. The winding 32 has one end connected to ground with the other end connected to a constant current source $I_{dc}$ through an Esaki diode E. In parallel with the Esaki and commonly connected with the source $I_{dc}$ is a resistor $R_2$ connected with the winding 34 on the core 30 terminating in ground. A control winding 36 for trigger pulses to the circuit of FIG. 4 is wound through a central aperture 38 of the core 30 and is adapted, when energized, to provide a field in quadrature with that caused by currents in windings 32 and 34. Again, the characteristic of the Esaki is shown in the FIG. 2 with the load line 28 providing stable operating states P and Q.

Assuming that the Esaki is in the stable operating state P, the current through the Esaki energizes winding 32 on the core 30 which maintains the core 30 saturated in the upward direction, which may be considered positive saturation, while the current through the resistor $R_2$ energizes the winding 34 tending to cause reversal of the magnetization of the core 30 in a downward direction, considered negative saturation, but since the Esaki has a low voltage drop with a high current passing therethrough, the voltage drop across the resistor R substantially equals the voltage drop across the Esaki, therefore a smaller current flows through the winding 34 than through winding 32 causing a net field in the upward direction to be applied to the core 30.

Upon energization of the control winding 36 with a pulse 37, a transverse or quadrature field is applied to the core 30 causing a clockwise rotation of the magnetization of the core 30 which induces a voltage on the winding 32 causing increased current flow through the Esaki. The Esaki then changes its operating state by moving from point P, in the FIG. 2, to point K whereupon the control signal terminates. The Esaki then moves toward its stable operating state Q, decreasing current flow therethrough, while there is a corresponding increase in current experienced through the resistor $R_2$. This current increase through the resistor $R_2$ causes an increasing field to be applied to the core 30 in the negative saturation direction by the further energization of the winding 34. The magnetization of the core 30 is then caused to switch toward the negative saturation direction. Again, as in the circuit of FIG. 1, since there is at all times a voltage balance for the two parallel circuits, it may be seen that as the Esaki moves from point K to point Q, enough current is allowed to pass through the resistor $R_2$ to switch the core 30 at the rate prescribed by the voltage balance, and once this point is reached the operation of the Esaki is kept fairly constant until switching is accomplished. Once the core 30 is switched to negative saturation, the Esaki attains the stable operating state Q and the core 30 is held in the negative saturation state by the current through the winding 34.

Operation of the circuit of FIG. 4 as described above may be enhanced with reference to the FIG. 5. Referring to the FIG. 5, a plot of applied fields H to the core 30 of the FIG. 4 is shown. The field applied to the core 30 when the Esaki is in the P operating state is represented by a field $H_a$ which is directed upward. The direction of flux, under influence of the field $H_a$ is shown by vector 40. Upon energization of the control winding 36 a quadrature field is provided to the core 30 and is shown as a field $H_t$. Under the influence of both the fields $H_a$ and $H_t$, a resultant field $H_r$ is provided to the core 30 which rotates the magnetization vector 40 through an arc to substantially align itself with the resultant field vector $H_r$. By projection of the flux vector 40 on the vertical coordinate the change in flux experienced by the winding 32 is shown causing an induced voltage in the winding 32 which initiates triggering of the Esaki to the stable state Q.

Upon application of another pulse 37 to the control winding 36, the magnetization of the core 30 is caused to rotate counter-clockwise causing a voltage to be induced in the winding 32 requiring the Esaki to have decreased current flow therethrough. The Esaki then moves its operating state from point Q to point L in the FIG. 2, whereupon the pulse 37 terminates. Upon removal of the operation of the Esaki from point Q to point L, the Esaki moves its operation from point L toward the stable operating point P. As the Esaki moves toward the stable condition P, the current therethrough increases providing a continually greater applied field to the core 30 in the upward direction due to the increased magnitude of current flowing in the winding 32. Thus the magnetization and therefore flux orientation within the core 30 is switched to positive saturation.

In the circuit operation described above, it was assumed, in both instances, that the pulse 37 energized the control winding 36 to provide a field $H_t$, as shown in the FIG. 5, directed toward the right. If, the winding 36 were energized so as to apply a quadrature field directed toward the left, it is seen that the magnetization of the core 30 would initially be rotated counter-clockwise to induce a voltage in the winding 32 which causes decreased current flow through the Esaki. Thus, if the Esaki were in the P stable operating state the trigger circuit would not switch, but if the Esaki were in the Q stable operating state the Esaki would be forced to switch to the point L and thence to the P stable state. This then causes the total magnetization of the core 30 to be directed downward. When the winding 36 is again energized with a similar pulse, the magnetization of the core 30 is rotated clockwise causing the Esaki to switch from point P to point K and thence to the Q stable state. Thus, the circuit of FIG. 4, like the circuit of FIG. 1 is capable of responding to trigger pulses of either polarity.

As in the embodiment of FIG. 1, an output is derived from the circuit of FIG. 4 by connecting utilization means across the Esaki to provide different voltage level outputs. If, instead of a voltage level output, a pulse type of output is desired, an output winding 42 may be provided coupling the core 30 as shown. The output signal obtained on the output winding 42 would then be directly related to the state of the Esaki and hence the circuit.

Referring to FIG. 6, another embodiment of this invention is shown for a quadrature field device. An anisotropic magnetic film 44 is provided having an easy direction of magnetization 46, with windings 48, 50 and 52 coupled to the film 44. The film 44 may be of thin or thick metallic type. The construction and fabrication of such films are well known in the art, as is their operation, which is particularly described in a copending application, Serial No. 823,909, filed June 30, 1959, in behalf of Paul E. Stuckert et al. and assigned to the same assignee, incorporated herein by reference. The winding 48 is center tapped to ground, having one end connected to a direct current source $I_{dc}$ through an Esaki diode E with the other end of the winding 48 also connected to the source $I_{dc}$ through a resistor $R_3$. The winding 48 when energized is adapted to provide a field parallel to the easy direction 46 of the film 44 while the winding 50 is adapted, when energized, to provide a field transverse to the easy direction 46 of the film 44. The winding 50 is employed for triggering the device of FIG. 6 from one stable operating state to another. The winding 52 may be utilized as an output winding and is wound in quadrature to the winding 50. Again, for voltage level type outputs, a utilization means is preferably connected across the Esaki diode. Circuit operation of the device of FIG. 6 is similar to the operation of the embodiment of FIG. 4 in that assuming the Esaki is operating at the stable state P, as is shown in FIG. 2, and a pulse 54 is directed into the winding 50 as indicated, a field similar to the field $H_t$ as shown in the FIG. 5, is applied to the film 44 rotating the magnetization of the film 44 clockwise. As the magnetization of the film 44 rotates, a voltage is induced in the winding 48 causing increased current flow through the Esaki diode and, referring to the FIG. 2, causing the operation of the Esaki to shift from point P to point K. The Esaki then seeks its stable operating point Q causing increased current flow through the resistor $R_3$ which energizes the winding 48 to apply a field parallel to the easy direction 46 of the film 44 in a downward direction, this parallel field completely rotates the magnetization of the film 44 from upward to the downward direction and achieves magnetization reversal by rotational switching rather than domain wall switching as achieved in the embodiments of FIGS. 1 and 4. Upon the reapplication of a pulse 54 to the winding 50, the field $H_t$ is again applied to the film 44, again causing rotation of the magnetization of the film 44 but in a counter-clockwise direction inducing an opposite polarity signal on the winding 48 causing decreased current flow to the Esaki which with reference to the FIG. 2, shifts the operating state of the Esaki from point Q to point L. As the change of flux decreases, the Esaki seeks its stable operating point P causing increased current flow through the Esaki and thence through the winding 48, causing a field to be applied to the film 44 parallel to the easy direction 46 and in an upward direction, completely rotating the magnetization of the film 44 to the upward direction. It is obvious that as the magnetization of the film is switched from the upward to the downward direction, or vice versa, an output pulse may be obtained on the outpt winding 52 or, preferably, as the Esaki switches from one stable operating state P to another stable operating state Q and thence back again, a voltage level output is obtained across the Esaki to the utilization means.

Further, since the element 44 is always energized to saturation in an upward or downward direction, as in the case of the magnetic materials employed in the embodiments of FIGS. 1 and 4, the structure need not have remanence and hence the material of film 44 need only be isotropic. It should be realized that while the winding 54, as described above in both instances, is energized by a similar polarity signal, that operation is equally attainable if signals of an opposite polarity were employed, analogous to the embodiment of FIG. 4.

In some instances it may be desirable to provide a trigger circuit such as shown in the FIGS. 4 or 6 to be polarity sensitive, in that the trigger pulses must be of a given polarity.

Referring to the FIG. 7, the circuit as shown in the FIG. 4 is again provided with the same reference numerals utilized where possible for clarity. Polarity sensitivity may be accomplished in two ways, the first of which is obvious; that is, to provide a diode 56 serially connected with the winding 36 as shown in the FIG. 7 in dotted form. The second method and perhaps more desirable from a cost standpoint, is to provide a bias winding 58 threading the core 30 through the aperture 38 and connected to a direct current source 60. The function of the bias winding 58 would then be to provide a constant transverse field to the element 30 such as shown in the FIG. 8 and labelled $H_{t8}$. Assuming that the Esaki is operating in the P stable state as shown in the FIG. 2, the net M.M.F. of the core 30 is such as to cause saturation of the magnetization of the element 30 in the upward direction to apply a field $H_{a8}$ as shown in the FIG. 8. The resultant magnetization at this time then follows the direction of the resultant applied field $H_{r8}$. If then, a signal were applied to the control winding 36 such as to cause rotation of the magnetization of the element 30 counterclockwise, a voltage would be induced in the winding 32 causing decreased current flow through the Esaki. Referring to the FIG. 2 the Esaki would move from its operating point P toward the left and down the curve and therefore, upon termination of this input signal through the winding 36, the Esaki would snap back to the point P, therefore causing no change in the circuit operational stable state. If, however, a signal where applied to the winding 36 such as to cause the magnetization of the element 30 to rotate in a clockwise direction, a voltage is induced on the winding 32 to cause increased current flow through the Esaki which then switches from operating state P to point K and thence to stable state Q, reversing the stable operating state of the circuit. It may be seen with consideration of the operation of the FIG. 4 that in order to change the operating state of the Esaki from point Q to point P, a voltage must be induced in the winding 32 to cause decreased current flow through the Esaki. This is accomplished by rotating the magnetization of the element 30 clockwise. If the signal energizing the winding 36 were again in such a direction as to rotate the magnetization clockwise there would be no change while if the signal applied to the winding 36 were in such a direction as to rotate the magnetization of the element counter-clockwise, the circuit and thus the Esaki would assume opposite stable operating states. It may be seen with reference to the FIG. 8 that in both instances the field provided by energization of the winding 36 must be directed toward the right, therefore insuring polarity sensitivity of the device.

Referring to the FIG. 9, the circuit embodiment shown in the FIG. 1 is again provided with similar reference numerals for clarity. The circuit of FIG. 9 includes a biasing winding 60 on the core 12 connected to a biasing winding 62 on the core 16 in order to make the trigger of FIG. 1 polarity sensitive. It may be seen that the bias windings 60 and 62 are connected serially opposed to a direct current source 64 which directs current into the dotted end of the winding 60 and the undotted end of the winding 62.

Consider the circuit of FIG. 9 when operating with the Esaki in the P stable state. The cores 12 and 16 are held in positive saturation by the current flow through the Esaki and into the undotted end of the windings 10 and 14. The degree to which the different cores 12 and 16 are saturated differ, in that the core 12, because of the bias, is saturated to a lesser degree than the core 16 at this time. Assume a trigger pulse 66 is directed into the dotted end of the winding 22 and the undotted end of the winding 24, circuit operation is then the same as that described above with reference to the FIG. 1. Thus the core 12 is switched toward negative saturation to change the operating state of the to point Q whereby the cores 12 and 16 are caused to switch to negative saturation. Similarly, upon application of a further trigger pulse 66 to the windings 22 and 24 on the cores 12 and 16, respectively, the core 16 is switched toward positive saturation causing the Esaki to reach its stable operating state P whereby the cores 12 and 16 are switched to positive saturation. Consider now operation of the circuit of FIG. 9 when the Esaki is in the P state and a trigger pulse is directed into the dotted end of winding 24 and the undotted end of winding 22. Since the core 12 is already positively saturated, it is not effected. Energization of the winding 24 applies a field to the core 16 tending to switch the core 16 from positive to negative saturation. Since the core 16 is biased toward positive saturation, the maximum applied field to the core 12 at the time is insufficient to overcome the bias. Thus, such a trigger pulse has no effect on the circuit. If the circuit of FIG. 9 were operating with the Esaki in the Q stable state and the cores in negative saturation, with a trigger pulse directed into the dotted end of winding 24 and the undotted end of winding 22 the circuit is uneffected since the core 16 is already in negative saturation. Similarly, since the core 12 is already in negative saturation and is biased toward negative saturation, this trigger pulse is ineffective to cause switching of the core 12 to positive saturation. Thus the trigger is shown to be polarity sensitive.

The polarity sensitive triggers of FIGS. 7 and 9 may be employed to construct binary counters such as shown in FIGS. 10, 11 and 12, respectively, wherein the binary triggers of the embodiments of FIGS. 7 and 9 are coupled from one similar trigger to another.

Referring to the FIG. 10, a binary counter employing two circuits of the embodiment of FIG. 7 is shown wherein similar reference numerals and notations are employed for clarity. The core 30 is coupled to the core 30′ of the succeeding trigger circuit by means of the output winding 42 on the core 30 connected to the trigger winding 36′ coupling the core 30′. Assuming that a trigger pulse 37 is directed into the winding 36 a quadrature field in the direction of the bias field is provided to the core 30 causing increased current flow through the Esaki as described above in description of the embodiment of FIG. 7, whereby the Esaki is caused to assume the Q stable state and the core 30 is switched from positive to negative saturation. As the core 30 switches from positive to negative saturation, a voltage is induced in the winding 42 with the dotted terminal positive causing current flow through the trigger winding 36′ on the core 30′ in such a direction as to provide a quadrature field to the core 30′ in a direction to aid the bias field. Similarly then, the core 30′ starts switching towards negative saturation causing increased current flow through the Esaki E′. Thus the Esaki E′ switches to the stable state Q and the core 30′ assumes negative saturation.

Upon application of another trigger pulse 37 to the winding 36, the core 30 is caused to start switching toward positive saturation whereby the Esaki E is forced to assume the P state and the core 36 to completely switch to positive saturation. The core 30 in switching to positive saturation induces a voltage in the winding 42 with the undotted end positive thereby energizing the trigger winding 36′ on the core 30′ to provide a quadrature field opposed to the bias field. Again as described above for the embodiment of FIG. 7, the Esaki E' passes more current and remains in the Q state.

Upon application of another trigger pulse 37 to the winding 36, the core 30 is switched to negative saturation while the Esaki E assumes the Q operating state. As the core 30 switches, a voltage is induced in the winding 42 with its dotted end positive causing a current to energize the winding 36' coupling the core 30' whereby a quadrature field which aids the bias field is applied. The core 30' is then switched to positive saturation and the Esaki E' assumes the operating state P. It may be seen therefore, that while the first trigger circuit is switched from one stable operating state to another by each trigger input, the second is switched once for each two input triggering impulses. Outputs for each trigger of the counter may be obtained across the Esaki or a further output winding 42 for each circuit may be provided coupling the core 30 to each trigger.

Referring to the FIG. 11, another embodiment of the counter of FIG. 10 is shown wherein the coupling between successive trigger circuits is accomplished by means of a capacitor 70. Again similar reference numerals and notations are employed as shown in the FIG. 7. Two trigger circuits similar to the embodiment of FIG. 7 are again employed with the trigger winding 36' of one trigger circuit connected across the Esaki E of the other trigger circuit through a capacitor 70. Assuming that the Esaki E and E' are both operating in the P state and that both the cores 30 and 30' are held in positive saturation, upon application of a trigger pulse 37 to the winding 36 of the core 30, a quadrature field is applied to the core 30 in aiding relationship to the quadrature field provided by the source 60 and the bias winding 58. The core 30 then starts switching toward negative saturation inducing a voltage on the winding 32 to cause increased current flow through the Esaki E which switches the operating point of the Esaki to the state Q and causes complete negative saturation of the core 30. When the Esaki E switches, in FIG. 2, from point P to point L, a voltage is impressed across the capacitor 70 and the winding 36' causing a quadrature field to be impressed on the core 30' in aiding relationship to the quadrature field provided by the bias winding 58' energized by the source 60. The core 30' then starts switching toward negative saturation causing the Esaki E' to switch to its high current state, and thereafter assuming the stable state Q. Thus after the first trigger pulse 37, the cores 30 and 30' are negatively saturated while the Esaki E and E' are left in the Q operating state.

Upon application of another trigger pulse 37, the core 30 is switched toward positive saturation causing the Esaki E to switch toward the P stable state. The Esaki E in switching to the low voltage state causes a decrease in potential across the capacitor 70 whereupon the capacitor 70 discharges to energize the winding 36' coupling the core 30'. Energization of the winding 36' causes a quadrature field in opposition to the bias field to be applied to the core 30' thus maintaining the core 30' in negative saturation and the Esaki E' in the Q operating state. As is observed, operation of the circuit of FIG. 12 is similar to operation of the circuit of FIG. 11 where only the coupling between succeeding triggers has been changed.

Referring to the FIG. 12, an embodiment of a binary counter based upon the polarity sensitive trigger described with reference to the FIG. 9 is shown. Again the same reference numerals and notations as employed in the FIG. 9 are here employed for clarity. Two circuits similar to the circuit of FIG. 9 are shown with the trigger windings of one circuit connected across the Esaki diode E of the other circuit through a serially connected capacitor 72. Assuming both E and E' are operating in the P stable state with the cores 12, 12', 16 and 16' held in positive saturation, a trigger pulse 66 directed into the windings 22 and 24 on the cores 12 and 16, respectively, starts switching the core 12 into negative saturation, causing the Esaki E to switch from state P toward state Q, as described above with reference to the embodiment of FIG. 9. The change in voltage resulting across the Esaki E charges the capacitor 72 and causes the core 12' to switch toward negative saturation and hence the Esaki E' to switch toward state Q. After termination of the first trigger pulse 66, the cores 12, 12', 16 and 16' are held in negative saturation while both Esakis E and E' are operating in the Q stable state. Application of another trigger pulse 66 causes the core 16 to switch toward positive saturation switching the Esaki whereby the core 12 is also switched to positive saturation. The decreased potential drop across the Esaki E causes discharge of the capacitor 72 to provide a current into the dotted end of the winding 24' and the undotted end of the winding 22' on the cores 16' and 12', respectively. The core 16' is now in negative saturation and biased toward positive saturation, while the core 12' is also in negative saturation and biased toward negative saturation. Therefore, the discharge current from the capacitor 72 has no effect on the core 16' and since the core 12' is biased negatively has no effect on the core 16'. Upon termination of the second trigger pulse 66, the Esaki E is left in the P operating state with the cores 12 and 16 saturated positively, while the Esaki E' is operating in the Q stable state with the cores 12' and 16' held in negative saturation. Receipt of another trigger pulse 66 serves to change the operating states of the Esakis E and E'. Thus the circuit of FIG. 9 may be coupled with a similar circuit to provide a counter circuit as shown in the FIG. 12.

While utilization means have not been shown in each of the embodiments of FIGS. 10–12, it is felt to be obvious that outputs from the circuits may be obtained across the Esaki E' in each of the embodiments. Further, in each of the embodiments described above the trigger pulses may terminate at any time after the tunnel diode has reached the knee of the curve when moving from point P to K or from point Q to L with satisfactory operation attained. How fast the trigger pulses are terminated after the different knees of the curve of FIG. 2 are attained determines the speed of operation of the circuits.

In the interest of providing a complete disclosure, details of one embodiment of the trigger circuits and counters wherein magnetic cores are employed are given below, however, it should be understood that other component values and current magnitudes may be employed with satisfactory operation attained, so that the values given should not be considered limiting.

In each of the embodiments the Esaki diodes may exhibit 80 milliamps of current at 70 millivolts for operation in the "P" state and 20 milliamps of current at 370 millivolts for operation in the "Q" stable state and the resistors $R_1$ and $R_2$ in each circuit may be 5 ohms. In the circuits employing two cores such as in the embodiment of FIG. 1, each of the cores 12 and 16 may comprise tape wound cores having twenty wraps of 1/16" by 1/8" mil 4–79 Permalloy tape on fifty mil outside diameter bobbins with each of the windings 10, 14, 18, 20, 22, 24, 60 and 62 having five turns. In the embodiments of FIGS. 4, 7, 11 and 12, the core 30 may comprise 1/4" mil, 80–20 nickel ferrite plated on the outside of an eighty mil ceramic tube and the length of the plate may be one inch with the coercive force of the material being two oersteds. The axial windings 32, 34 and 42 may have thirty turns each with the windings 36, 42 and 58 having eight turns. The trigger pulses 37 may have a magnitude of 0.5 ampere with the source 60 energizing the bias winding 58 with a current of 0.5 ampere. The source 64 may provide fifty milliamperes while the trigger pulses 66 may provide currents of eighty milliamperes. The capacitors 70 and 72 may have a value of 0.1 microfarad.

While the invention has been particularly shown and described with reference to preferred embodiments thereof, it will be understood by those skilled in the art that various changes in form and details may be made therein without departing from the spirit and scope of the invention.

In the claims:

1. A trigger circuit comprising, a current source, a linear impedance element, a tunnel diode element adapted to be operated in a first and a second stable state, means connecting said elements with said source, input and output means, and means, including means saturable in a first and second direction of flux orientation, magnetically coupling said elements and said input and output means for alternately switching said diode from one stable operating state to another responsive to successive pulses of either polarity so that an impulse is provided on said output means the polarity of which is indicative of the state of said trigger.

2. The circuit of claim 1, including further means coupled with said elements and said input and output means for causing said diode to be responsive only to the energization of said input means by a signal of predetermined polarity.

3. A trigger circuit comprising, a current source, a linear impedance element, a tunnel diode element adapted to be operated in a first and a second stable state, input means, a magnetic member capable of being saturated in different directions of magnetization coupling said elements and means for switching said diode alternately from one of its stable states to the other responsive to successive pulses of either polarity applied to said input means.

4. A trigger circuit comprising, a current source, a linear impedance element, a tunnel diode element adapted to be operated in a first and a second stable state, a magnetic element made of material exhibiting a substantially rectangular hysteresis characteristic, a plurality of windings including an input winding coupling said element, means connecting said diode and impedance elements with said source and with different windings of said plurality of windings coupling said magnetic element, said input winding coupling said magnetic element in orthogonal relationship with said different windings so that the magnetization of said magnetic element is partially rotated upon energization of said input winding to cause said diode to switch alternately from one stable operating state to another responsive to successive pulses of either polarity whereupon the magnetization of said magnetic element is reversed.

5. A trigger circuit comprising, a current source, a linear impedance element, a tunnel diode element adapted to be operated in a first and a second stable state, input means, means connecting said elements with said source, and means magnetically coupling said elements in one relationship and further coupling said input means in orthogonal relationship with respect to said one relationship for switching said diode alternately from one to another of said stable operating states in response to the energization of said input means by successive pulses of either polarity.

6. A trigger circuit comprising, a current source, a resistor, a tunnel diode adapted to be operated in a first and a second stable state, means connecting said resistor and diode to said source, a magnetic core coupling said diode and said resistor, input and output winding means coupling said core, said input means when energized adapted to cause said diode to switch alternately from one to another stable state responsive to successive pulses of either polarity whereupon an impulse is provided on said output winding means whose polarity is indicative of the state of said trigger.

7. The circuit of claim 6 wherein said core is cylindrically shaped having a central aperture along its longitudinal axis and said input winding threads through said aperture.

8. A trigger circuit comprising, a current source, a linear impedance element, a tunnel diode element adapted to be operated in a first and a second stable state, a magnetic thin film member exhibiting an easy direction of magnetization, a plurality of windings including an input winding coupling said member, means connecting said elements with said source and further connecting said elements to different windings of said plurality of windings, said input winding adapted to apply a field transverse to the easy direction of said member when energized to partially rotate the magnetization of said member whereby a voltage is induced on said different windings, said diode responsive to the voltage induced on said different windings to switch alternately from one operating state to another, responsive to successive pulses of either polarity and cause a field to be applied to said member completely rotating the magnetization thereof from one direction to another.

9. The trigger of claim 8 wherein said different windings are wound in quadrature to the input winding.

10. A trigger circuit comprising, a current source, a linear impedance element, a tunnel diode element adapted to be operated in a first and a second stable state, a thin film member made of magnetic material having a plurality of magnetic moments, said member exhibiting an easy direction of magnetization along which said moments tend to align themselves to define different stable directions of remanent magnetization, means connecting said elements with said source, input means, said member coupling said elements and said input means so that said moments are caused to partially rotate upon energization of said input means to cause said diode to switch alternately from one stable operating state to another, responsive to successive pulses of either polarity whereupon said moments are caused to completely rotate from one direction of magnetization to another.

11. A trigger circuit comprising, a current source, a tunnel diode adapted to be operated in either of two stable states, a resistor, means connecting said diode and resistor with said source, first and second magnetic cores including first and second winding means coupling said diode and said resistor parallel circuit relationship, winding means including an input and an output winding on each said core, the input winding on said first core connected with the input winding on said second core, the output winding on said first core serially connected with the output winding on said second core, said input windings adapted to be energized to cause said diode to switch from one operating state toward another whereby said cores are selectively established in a datum and an opposite state of saturation in accordance with the previous state of said diode to thereby provide an impulse on said output windings whose polarity is representative of the state of said trigger.

12. A trigger circuit comprising, a current source, a tunnel diode adapted to be operated in a first and a second stable state, a linear impedance, means connecting said diode and said impedance with said source, first and second bistable magnetic cores, winding means including input and output windings on each said cores, said diode connected to a first of said winding means on each said core, said impedance connected to a second of said winding means on each said core whereby said impedance and said diode are mutually coupled by said cores, the input winding on said first core serially connected with the input winding on said second core, the output winding on said first core serially connected with the output winding on said second core, said input windings adapted to cause said diode to switch from one operating state to another when energized whereby an impulse is provided on said output windings the polarity of which is indicative of the state of said trigger.

13. A trigger circuit comprising, a current source, a linear impedance, a tunnel diode adapted to be operated in a first and a second stable state, first and second bistable magnetic cores, first and second control windings and input and output windings on each said core, circuit means serially connecting said source with said diode and the first control winding on each of said first and second cores and further connecting the impedance in series with the second control winding on each of said first and second cores in parallel relationship with said diode and in series with said source, means connecting the output windings on said cores in series, and further means connecting the input windings in series so that energization of said input windings causes said diode to switch from one to another of said stable states whereby an impulse is provided on said output windings the polarity of which is indicative of the state of said trigger.

14. The trigger of claim 13 wherein said input windings are connected serially opposed.

15. The trigger of claim 14 including means for biasing said cores toward opposite states of magnetization.

16. A trigger circuit comprising, a current source, a linear impedance element, a tunnel diode element adapted to be operated in a first and a second stable state, means connecting said elements with said source, input means and biasing means, and means magnetically coupling said elements and said input and biasing means so that said diode is responsive to the energization of said input means by a given polarity impulse only to switch from one stable operating state to another.

References Cited by the Examiner

UNITED STATES PATENTS

| | | | |
|---|---|---|---|
| 2,565,497 | 8/51 | Harling | 307—88.5 |
| 2,713,132 | 7/55 | Mathews | 307—88.5 |
| 2,843,765 | 7/58 | Aigrain | 307—88.5 |
| 2,944,164 | 7/60 | Odell | 307—88.5 |

OTHER REFERENCES

"The Tunnel Diode," I. A. Lesk et al., "Electronics," November 27, 1959, pp. 60–64.

IRVING L. SRAGOW, *Primary Examiner.*

JOHN F. BURNS, *Examiner.*